Patented June 5, 1923.

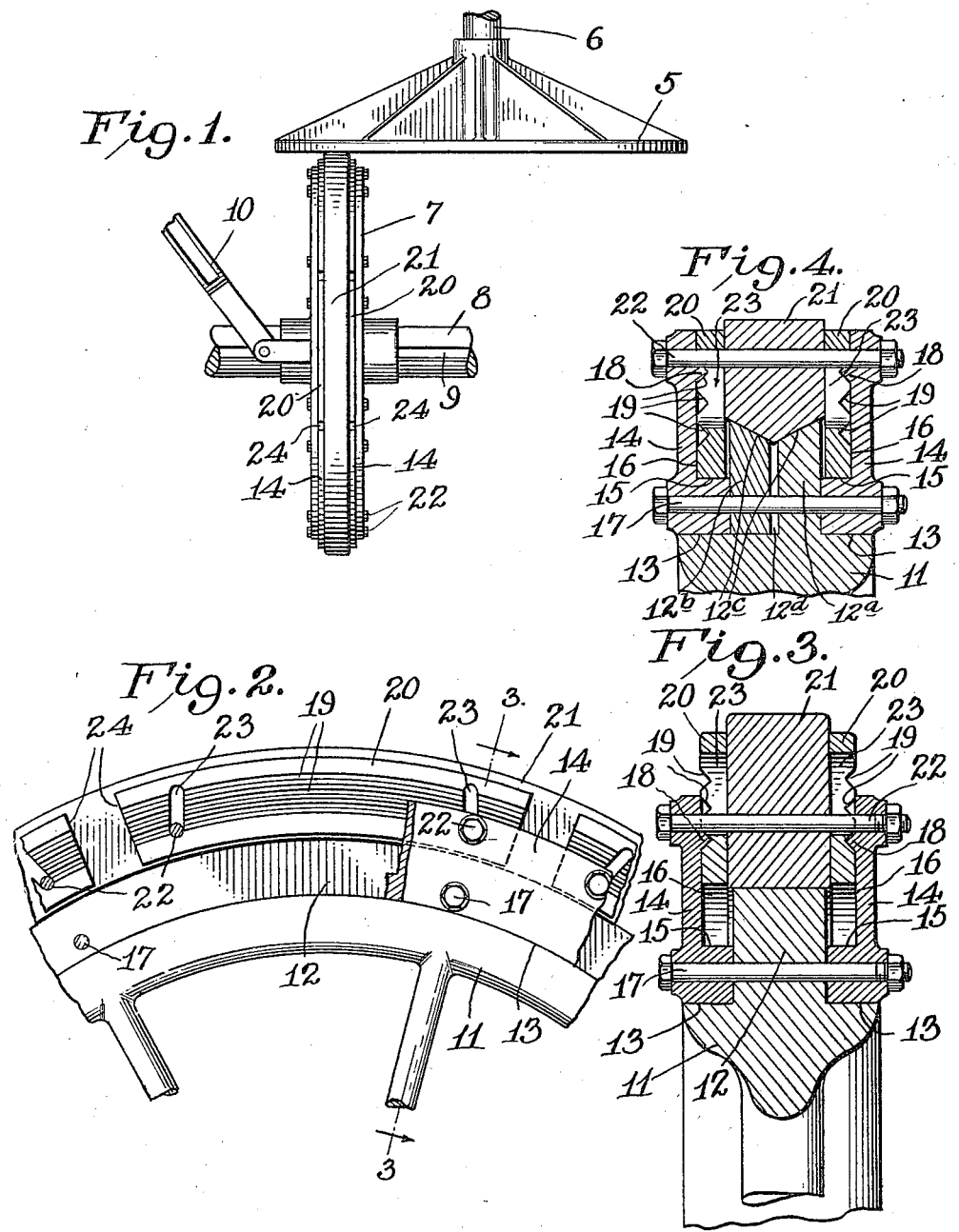

1,457,524

UNITED STATES PATENT OFFICE.

WILLIAM L. ISBILLS, OF ELIZABETH, NEW JERSEY.

FRICTION WHEEL.

Application filed February 25, 1922. Serial No. 539,147.

*To all whom it may concern:*

Be it known that I, WILLIAM L. ISBILLS, a citizen of the United States, and residing at Elizabeth, in the county of Union and State of New Jersey, have invented certain new and useful Improvements in Friction Wheels, of which the following is a specification, such as will enable those skilled in the art to which it appertains to make and use the same.

This invention relates to friction wheels and particularly to wheels of this class used as drive or transmission wheels for motor vehicles, and the object of the invention is to provide an improved mounting for the friction facing of wheels of this class whereby the life of such facing may be materially extended by adjusting certain parts of the mounting therefor; and with this and other objects in view the invention consists in a wheel of the class and for the purpose specified which is simple in construction and efficient in use, and which is constructed as hereinafter described and claimed.

The invention is fully disclosed in the following specification, of which the accompanying drawing forms a part, in which the separate parts of my improvement are designated by suitable reference characters in each of the views, and in which:—

Fig. 1 is a diagrammatic view of a friction transmission drive showing my improved friction wheel in operative position;

Fig. 2 an enlarged side view of a part of the friction wheel with parts of the construction broken away in section;

Fig. 3 a partial section on the line 3—3 of Fig. 2 on an enlarged scale; and,

Fig. 4 a view similar to Fig. 3 with parts of the construction in a different position, and showing a modification.

In Fig. 1 of the drawing, I have shown for the purpose of illustrating one form or method of using my improved friction wheel, the two friction drive elements of a motor vehicle, and in said figure 5 represents the usual drive wheel mounted upon the shaft 6 propelled by the engine of the vehicle, and at 7 I have shown my improved friction wheel slidably mounted upon a shaft 8 and keyed thereto by a key construction 9, the friction wheel 7 being operated through a suitable lever 10 in the usual or any desired manner.

The friction wheel 7, or the rim portion 11 thereof, is of the cross section shown in Fig. 3 of the drawing, the outer face being reduced to form a central projecting ring 12 on the periphery of the wheel, which forms annular recesses 13 on the opposite side faces of the rim. Mounted in the recesses 13 are annular plates or rings 14 provided with enlarged bases 15 which fit in the recesses 13 and are of such height as to form annular chambers 16 between the reduced portions of the plates or rings 14, and the outer face of the central projecting member 12 and a plurality of bolts 17 are passed through the enlarged base portions 15 of the plates or rings 14 and through the projecting member 12, and these bolts serve to secure and hold the plates or rings 14 in connection with the rim 11 of the friction wheel.

Adjacent to the outer edge of the plates or rings 14, the inner faces thereof are provided with inwardly projecting members 18 which are substantially V-shaped in form, as clearly shown in Fig. 3, and these projecting members are adapted to operate in connection with V-shaped grooves 19 formed in the outer faces of a plurality of arc-shaped plate members 20 located within the annular plates or rings 14 and which are adapted to bear on the outer side faces of an annular friction facing 21 mounted upon the projecting member 12 of the rim 11 and of slightly greater transverse dimensions than said member. as clearly shown in Fig. 3. A plurality of bolts 22 are passed through the annular plates or rings 14 and through elongated apertures 23 in the opposite end portions of the arc-shaped plates 20, as clearly shown in Fig. 2 of the drawing, and these bolts serve to hold the members 20 in predetermined positions of adjustment and firmly in engagement with the friction facing 21 of the wheel as well as to securely hold said facing in position and to reinforce the same.

The operation and use of my improved friction wheel will be readily understood from the foregoing description when taken in connection with the accompanying drawing and the following statement.

In Figs. 1 to 3 inclusive, I have shown the normal position of my improved friction wheel in which the projecting members 18 of the rings 14 are in engagement with the innermost grooves 19 of the arc-shaped members 20, and said arc-shaped members or the adjacent ends thereof are spaced apart as shown at 24 in Fig. 2 of the drawing, and the friction facing 21 projects a predetermined distance beyond the outer face of the members 20, as clearly shown in said figures. When the outer face of the friction facing 21 of the wheel becomes worn or is worn down to or approximately to the outer faces of the members 20, the bolts 17 and 22 are loosened and the members 20 moved inwardly to bring the projecting members 18 into engagement with the central or intermediate grooves 19, and when the facing 21 again wears down to the outer facing of the members 20, the above operation of adjusting the members 20 inwardly is repeated to bring the parts into the position shown in Fig. 4 of the drawing, and the facing 21 may be again worn down to, or approximately to, the outer faces of the members 20, and in this way it will be apparent that by making the two adjustments above specified, I produce three facings on the friction facing 21 which may be worn before the said facing ring 21 need be removed and a new one substituted therefor.

When a new fibrous facing 21 is substituted it will be apparent that the parts are assembled in the position shown in Figs. 1 to 3 inclusive. It will also be apparent that in the above described movements or adjustments of the members 20 the same is moved inwardly in the annular recesses 16, and as said members are adjusted inwardly the adjacent ends of the separate members are brought closer together.

It will be noted that in Fig. 4 I have shown a slight modification of the construction shown in Figs. 2 and 3 in which the central projection 12 of the rim is reduced or partially cut away on one side to form a projecting member 12ª and an annular ring 12ᵇ is mounted upon the rim 11 which in combination with the projection 12ª forms a projection substantially similar to the projection 12 shown in Fig. 3, and the outer faces of the projection 12ª and ring 12ᵇ are beveled as shown at 12ᶜ to receive a correspondingly beveled seat on the inner face of the friction facing 21 and the bolts 17 serve to hold the various parts together as will be apparent. It will be noted that I preferably provide a space 12ᵈ between the projection 12ª and ring 12ᵇ.

The object of the modification shown in Fig. 4 of the drawing is to securely hold the facing ring 21 in position as well as to reinforce the same. It will be understood that while I have shown certain details of construction for carrying my invention into effect that I am not necessarily limited to these details, and various changes therein and modifications thereof may be made, within the scope of the appended claims without departing from the spirit of my invention or sacrificing its advantages.

Having fully described my invention, what I claim as new and desire to secure by Letters Patent, is:—

1. A friction wheel of the class described, the rim of said wheel being provided with annular side plates, a friction facing mounted upon the periphery of said wheel and between said side plates, and members adjustable radially of said wheel and located between said side plates and said friction facing for reinforcing and holding said friction facing in position on said wheel, means for securing said side plates and said members in connection with the rim of the wheel, and means on said side plates and said members for locking said members in different positions of adjustment.

2. A wheel of the class described, the rim of said wheel being provided with a central annular projection an annular friction facing ring mounted thereon, said member forming on the opposite sides of said rim annular recesses, annular plates mounted in the recesses of said rim, bolts passed through said annular plates and the projecting member of said rim for securing said annular plates in position, a plurality of adjustable members mounted between said annular plates and said facing ring, and means for holding said members in predetermined positions of adjustment.

3. A wheel of the class described, the rim of said wheel being provided with a central annular projection a friction facing ring mounted thereon, said member forming on the opposite sides of said rim annular recesses, annular plates mounted in the recesses of said rim, bolts passed through said annular plates and the projecting member of said rim for securing said annular plates in position, a plurality of arc-shaped members mounted between said annular plates and said friction facing, said members being provided with a plurality of spaced recesses in the outer faces thereof, and said annular plates being provided with projecting members adapted to engage one of the recesses in each of said members for locking said members against radial movement.

4. A wheel of the class described, the rim of said wheel being provided with a central annular projection a friction facing ring mounted thereon, said member forming on the opposite sides of said rim annular recesses, annular plates mounted in the recesses of said rim, bolts passed through said annular plates and the projecting member of said rim for securing said annular plates in position, a plurality of arc-shaped members mounted between said annular plates and said friction facing, said members being provided with a plurality of spaced recesses in the outer faces thereof, said annular plates being provided with projecting members adapted to engage one of the recesses in each of said members for locking said members against radial movement, and bolts passed through said annular plates and said friction facing and through elongated apertures in said members for securely holding said parts in position.

5. A friction wheel of the class described provided with a removable unitary friction ring, means adjustably mounted on said wheel for reinforcing and supporting said ring and for extending the use of the friction facing thereof, and means movable transversely of said wheel and cooperating with the inner face of said ring for rigidly holding the same in predetermined position on said wheel.

In testimony that I claim the foregoing as my invention I have signed my name this 21st day of February 1922.

WILLIAM L. ISBILLS.